No. 888,914. PATENTED MAY 26, 1908.
F. W. LEUTHESSER.
AIR VALVE FOR RADIATORS.
APPLICATION FILED APR. 19, 1907.
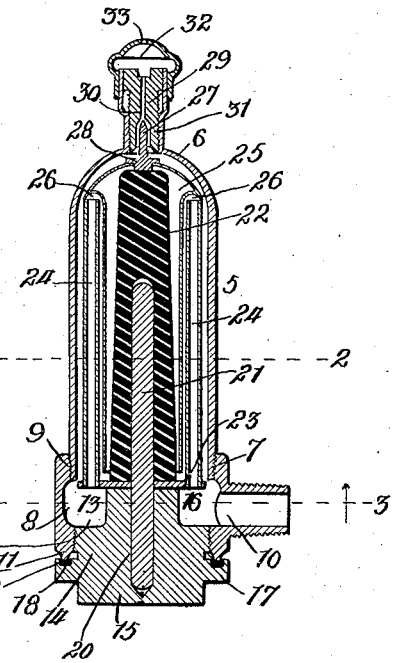
Fig. 1.
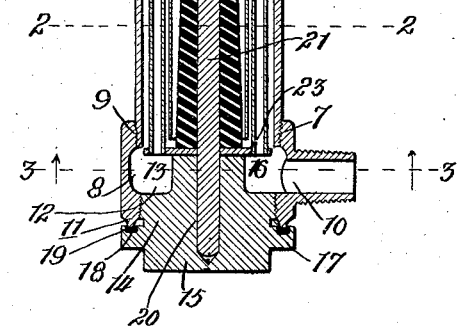
Fig. 2.   Fig. 3.
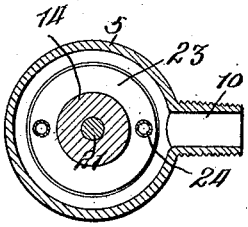
Fig. 4.
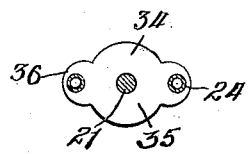
Witnesses:
Wm P. Bond
Pauline Beekman
Inventor
Fred W. Leuthesser
by Banning & Banning
Attys.

UNITED STATES PATENT OFFICE.

FRED W. LEUTHESSER, OF CHICAGO, ILLLINOIS.

AIR-VALVE FOR RADIATORS.

No. 888,914.   Specification of Letters Patent.   Patented May 26, 1908.

Application filed April 19, 1907. Serial No. 369,114.

*To all whom it may concern:*

Be it known that I, FRED W. LEUTHESSER, a citizen of the United States, residing at Chicago, in the county of Cook and State of Illinois, have invented certain new and useful Improvements in Air-Valves for Radiators, of which the following is a specification.

This invention relates more particularly to air valves of the type employing a float in combination with a vulcanite post for the purpose of regulating the air discharge outlet. In valves of this character it is customary to form the body or shell of the valve of very thin material and to screw thread it into the heavier base portion. In use, that there may be no leakage, it is necessary that a very tight screw threaded connection be made which renders it extremely difficult, if not impossible, to remove the shell from the base portion in order to secure access to the interior of the valve for purposes of replacement or repair. The shell being of thin material cannot ordinarily be unscrewed with a wrench or similar implement without crushing it, so that it is ordinarily necessary, in the use of valves of this character, to either discard the valve when out of order or send it back to the factory for repair.

One of the objects of the present invention is to provide a valve having in its base a removable plug of heavy construction which can be easily unscrewed by means of a wrench, thereby permitting access to be had to the interior and to the operative portions of the valve without attempting to unscrew the thin shell from the base portion.

Another object of the invention is to position the working parts of the valve upon the removable plug so that the working parts will be removed bodily with the plug, which facilitates the adjustment of the parts and the ease with which they can be repaired.

The invention further relates to the construction of a float and the means by which it is guided and positioned in proper adjustment with respect to the expansible plug upon which it is mounted. In previous constructions a single air tube, adjacent to the float, has been employed, but the present invention contemplates the use of two of such tubes on opposite sides of the float, which serve to position and guide the float and prevent it from swinging out of vertical alinement, which displacement will frequently occur where but one side of the float is indented for accommodation of a single air passage, thereby unequally distributing the weight of the float and disturbing its equilibrium.

The invention consists in the features of construction and combination of parts hereinafter described and claimed.

In the drawings, Figure 1 is a longitudinal sectional elevation of the entire valve; Fig. 2 a cross sectional view taken on line 2—2 of Fig. 1 looking in the direction of the arrow; Fig. 3 a cross sectional view taken on line 3—3 of Fig. 1 looking in the direction of the arrow; and Fig. 4 a slightly modified form of base plate for the air tubes.

The valve consists essentially in a dome-shaped shell 5 having a curved top 6 of the usual character, and having its lower edge 7 screw-threaded into a base chamber 8 having a neck or flange 9 adapted to receive the screw-threaded end of the shell. The base chamber is provided at one side with a tapered screw-threaded nipple 10 which is adapted for attachment to the radiator. The lower edge 11 of the base chamber is reduced in diameter, and the base chamber, immediately above the lower edge, is provided with interior screw-threads 12, which engage with screw-threads 13 on a removable plug 14. The removable plug comprises an exterior squared head 15 adapted to receive a wrench or similar implement, and an interior stud 16 of reduced diameter. The removable plug is provided with a circumferential flange 17, which latter has in its upper face a recess 18, within which is a washer 19 of lead or similar material, which is adapted to coöperate with the edge 11 when the removable plug is screwed into place, affording a tight seal against the escape of air or water.

The removable plug is provided in its center with a vertical hole 20 into which is entered a pin 21 which serves as a reinforcement for a vulcanite post 22 which surrounds the pin and is positioned thereby. Between the lower end of the vulcanite post and the interior stud 16 is a base plate 23 which is preferably of circular formation, as shown in Fig. 3, and which is of sufficient diameter to overhang the interior stud, as shown in Fig. 1. The base plate serves as a support for a pair of oppositely disposed vertical air tubes which are located near the periphery of the plate and in close proximity to the walls of the shell. Surrounding the vulcanite post is a float 25, of usual dome-shape, provided in opposite sides with vertical channels or indentations 26 of suitable size to afford a clearance between the float and the air tubes, which channels or indentations are formed by inwardly bending or pressing the metal of the float from a cylindrical formation, as indicated in Fig. 2. This method of forming the channels or indentations equalizes the weight of the float with respect to its axis, so that the float will rise and fall without being thrown out of equilibrium, which would be the case if but a single channel were provided. The float has secured to its upper end a needle valve 27 which, at its lower end, terminates in a flanged plug 28 which passes through the center of the float and serves as a bearing for the float when supported on the upper end of the vulcanite post. The needle valve coöperates with a valve plug 29 having an air vent 30, which plug is screw-threaded into a neck 31 on the upper end of the dome-shaped shell. The summit of the valve is closed by means of a cap 32 having an air vent 33 of the usual character.

The shape of the base plate upon which the air tubes are supported may be modified, and, in place of the circular disk-shaped formation herein described, a plate 34 of the character shown in Fig. 4 may be employed, which plate comprises a substantially circular body portion 35, and outwardly extending ears 36 which serve for the reception of the air tubes.

In use, when it is desirable to remove the interior mechanism for any purpose, the removable plug is unscrewed, which carries with it the float, the air tubes, the vulcanite post, and the connected portions of the device which comprise all the working mechanism of the valve. These parts can be thus removed and repaired or replaced without disturbing the shell or attempting to unscrew it from the base. This enables repairs to be made to the valve without the use of special tools or having to send the valve back to the factory for repair. In many cases very slight cleaning of the mechanism may serve to remedy a difficulty which in ordinary cases could only be remedied by sending the entire valve back to the factory. At the same time, the connection between the shell and base being undisturbed, no danger of leaking at this point will be incurred, so that the life of the valve will be much longer than is the case with ordinary valves of this style. The method of supporting the air tubes enables the parts to be quickly assembled, and the provision of duplicate air tubes on opposite sides of the float not only increases the capacity of the valve for discharging air, but serves to position the float equally on opposite sides, thereby causing it to hang true and in direct alinement with the air vent passage.

Although the valve as shown embodies both an expansible vulcanite post and a float, it is plain that the removable plug can likewise be employed in many cases in which one or the other of these devices is omitted.

What I regard as new and desire to secure by Letters Patent is:

1. In an air valve for radiators, the combination of a chambered base provided with a nipple adapted to be entered into a radiator, a removable plug screw-threaded into the bottom of the base, a shell screw-threaded into the top of the base and provided with an air discharge outlet, a base plate supported upon the removable plug, a plurality of symmetrically positioned air tubes entered through and upwardly extending from the base plate and in communication with the interior of the base, and a float valve controlling the air vent passage and provided in its sides with channels or indentations adapted to receive the air tubes whereby the float will be positioned and guided, substantially as described.

2. In an air valve for radiators, the combination of a chambered base provided with a nipple adapted to be secured to a radiator, a dome-shaped shell tightly screw-threaded into the top of the base and provided with an air vent passage, a removable plug screw-threaded into the bottom of the base, a pin upwardly extending from the removable plug, a vulcanite post entered onto the pin, a base plate surrounding the pin intermediate the vulcanite post and the removable plug, a pair of oppositely disposed air tubes entered through and upwardly extending from the base plate and in communication with the interior of the base, and a float valve surrounding the vulcanite post and provided with channels or indentations adapted to receive the air tubes whereby the float will be positioned and guided, both the vulcanite post and the float being operable to control the air vent passage, substantially as described.

3. In an air valve for radiators, the combination of a chambered base of relatively rigid formation and having formed thereon a tubular nipple in communication with the interior of the base and adapted to be secured to the radiator, a relatively heavy imperforate plug screw-threaded into the bottom of the base and tightly closing the bottom of the base and forming the bottom of the air valve, automatic valve mechanism operable by changes in temperature to control the discharge of air supported upon and removable with the plug, and an elongated relatively thin shell tightly screw threaded into the top of the base and upwardly extending therefrom and inclosing the valve mechanism, substantially as described.

4. In an air valve for radiators, the combination of a chambered base of relatively rigid formation and provided with a tubular nipple outwardly extending from one side of the base and in communication with the interior of the base, a rigid imperforate plug screw threaded to the bottom of the base and closing the bottom of the chamber in the base and forming the bottom of the air valve, a stud formed on and upwardly extending from the center of the plug and partially filling the chamber of the base, automatic regulating mechanism operable by changes in temperature to control the discharge of air mounted upon the stud and removable with the plug, and an elongated relatively thin shell screw threaded into the top of the base and inclosing the regulating mechanism, substantially as described.

FRED W. LEUTHESSER.

Witnesses:
WALKER BANNING,
PAULINE BECKMAN.